(12) United States Patent
Bray

(10) Patent No.: US 8,096,359 B2
(45) Date of Patent: Jan. 17, 2012

(54) METHOD OF CEMENTING USING POLYMERIC RETARDER

(75) Inventor: Windal S. Bray, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 613 days.

(21) Appl. No.: 11/601,512

(22) Filed: Nov. 17, 2006

(65) Prior Publication Data

US 2008/0115938 A1    May 22, 2008

(51) Int. Cl.
*E21B 33/13* (2006.01)
(52) U.S. Cl. ........................ 166/293; 166/292
(58) Field of Classification Search .................. None
See application file for complete search history.

(56) References Cited

U.S. PATENT DOCUMENTS

| | | | | |
|---|---|---|---|---|
| 4,888,059 A * | 12/1989 | Yamaguchi et al. | | 106/823 |
| 4,941,536 A * | 7/1990 | Brothers et al. | | 166/293 |
| 5,105,885 A | 4/1992 | Bray et al. | | |
| 5,184,680 A | 2/1993 | Totten et al. | | |
| 5,421,881 A * | 6/1995 | Rodrigues et al. | | 106/809 |
| 5,613,558 A | 3/1997 | Dillenbeck, III | | |
| 5,658,380 A | 8/1997 | Dillenbeck, III | | |
| 5,739,212 A | 4/1998 | Wutz | | |
| 6,145,591 A | 11/2000 | Boncan et al. | | |
| 6,227,294 B1 | 5/2001 | Chatterji et al. | | |
| 6,376,580 B1 | 4/2002 | Ikuta | | |
| 6,444,747 B1 * | 9/2002 | Chen et al. | | 524/807 |
| 6,591,910 B1 | 7/2003 | Chatterji et al. | | |
| 6,770,604 B2 | 8/2004 | Reddy et al. | | |
| 6,832,652 B1 | 12/2004 | Dillenbeck et al. | | |
| 6,869,998 B2 * | 3/2005 | Bair et al. | | 524/556 |
| 6,978,835 B1 * | 12/2005 | Reddy et al. | | 166/294 |
| 7,021,380 B2 | 4/2006 | Caveny et al. | | |
| 2003/0120027 A1 | 6/2003 | Valls | | |
| 2005/0009959 A1 | 1/2005 | Bair et al. | | |

FOREIGN PATENT DOCUMENTS

| | | |
|---|---|---|
| EP | 0572261 A1 | 12/1993 |
| EP | 0592217 A2 | 4/1994 |
| EP | 0659702 A1 | 6/1995 |
| EP | 1175378 B1 | 9/2003 |
| WO | WO 00/63134 | 10/2000 |
| WO | 0246253 A2 | 6/2002 |
| WO | WO 03/031365 A1 | 4/2003 |

* cited by examiner

*Primary Examiner* — Angela M DiTrani
(74) *Attorney, Agent, or Firm* — John Wilson Jones; Jones & Smith, LLP

(57) ABSTRACT

Set retarders of copolymers of at least one polymerizable ethylenically unsaturated monomer and at least one alkoxylated sulfate, phosphate or ketonic salt are capable of delaying the hardening of a cementitious slurry when introduced into a subterranean formation until a downhole temperature greater than or equal to 500° F. is obtained, even in the absence of an intensifier. The ethylenically unsaturated monomer is preferably a carboxylic acid, amido carboxylic acid, carboxylic acid ester, amido carboxylic acid ester, hydroxylated alkyl ester of a carboxylic acid or a hydroxylated amido carboxylic acid ester, sulfonic acid, phosphonic acid or amide as well as mixtures thereof and the alkoxylated sulfate, phosphate or ketonic salt is of the formula:

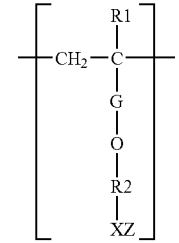

wherein unit R1 is H or a $C_1$-$C_4$ alkyl; R2 is —$(CH_2CH_2$—O—$)_n$ or (—$CH_2CHCH_3$—O—$)_n$ or a mixture thereof; n ranges from about 1 to about 100; X is an anionic radical selected from —$SO_3$, —$PO_3$ or —COO or a water soluble cationic moiety which counterbalances the valence of the anionic radical X.

25 Claims, No Drawings

METHOD OF CEMENTING USING POLYMERIC RETARDER

FIELD OF THE INVENTION

The invention relates to methods of cementing an oil or gas well at elevated temperatures using an alkoxylated copolymer as retardant and dispersant.

BACKGROUND OF THE INVENTION

Hydraulic cements are cements that set and develop compressive strength due to a hydration reaction, and thus can be set under water. As such, hydraulic cements are often used for cementing pipes or casings within a wellbore of a subterranean formation as well as other purposes, such as squeeze cementing. In the oil and gas industry, successful cementing of well pipe and casing during oil and gas well completion requires cement slurries having several important properties. The cement slurry must have a pumpable viscosity, fluid loss control, minimized settling of particles and the ability to set within a practical time.

In a typical completion operation, the cement slurry is pumped down the inside of the pipe or casing and back up the outside of the pipe or casing through the annular space. This seals the subterranean zones in the formation and supports the casing. Under normal conditions, hydraulic cements, such as Portland cement, quickly develop compressive strength upon introduction to a subterranean formation, typically within 48 hours from introduction. As time progresses, the cement develops greater strength while hydration continues.

It is common to use a set retarder with the hydraulic cement in order to delay the set time of the cement composition. Such set retarders are particularly useful when the cement composition is exposed to high subterranean temperatures. In addition to being capable of delaying the set time of the cement composition, the set retarder also functions to extend the time the cement composition remains pumpable after the cement composition is mixed and before it is placed into the desired location.

In use, many of the set retarders of the prior art exhibit unpredictable retardation of the set time of the cement composition especially at elevated temperatures. For instance, lignosulphonates are often used with borate retarder intensifiers to retard Portland cement in oil wells at temperatures in excess of 350° F. Such set retarder compositions, however, are only somewhat effective as downhole temperatures increase to 500° F.

A need therefore exists for the development of cement compositions containing a set retarder (preferably which does not require an intensifier) and which is effective at downhole temperatures in excess of 500° F.

SUMMARY OF THE INVENTION

Copolymers of at least one polymerizable ethylenically unsaturated monomer and at least one alkoxylated sulfate, phosphate or ketonic salt may be employed to retard the set time of a cementitious slurry introduced into a subterranean formation penetrated by a wellbore. The set retarder is capable of delaying the hardening of the cementitious slurry until a downhole temperature greater than or equal to 500° F. is obtained, even in the absence of an intensifier.

The copolymer used in the cementitious slurry is of the formula:

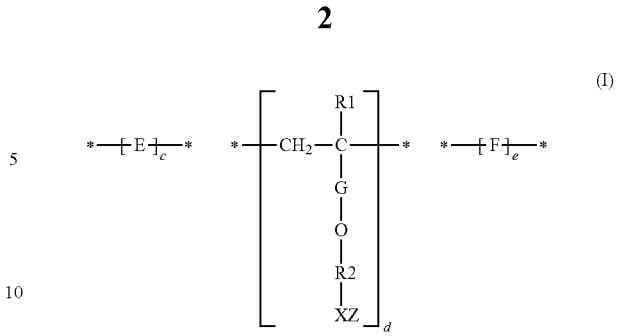

wherein unit E represents the polymerizable ethylenically unsaturated monomer, F represents an optional comonomer and the second monomer represents the alkoxylated sulfate, phosphate or ketonic salt. In a preferred embodiment, E is a carboxylic acid, amido carboxylic acid, carboxylic acid ester (such as a $C_1$-$C_6$ alkyl ester of carboxylic acid), amido carboxylic acid ester (such as a $C_1$-$C_6$ alkyl ester of amido carboxylic acid), hydroxylated alkyl ester of a carboxylic acid (such as a hydroxylated $C_1$-$C_6$ alkyl ester of carboxylic acid) or a hydroxylated amido carboxylic acid ester (such as a $C_1$-$C_6$ hydroxylated amido carboxylic acid ester), sulfonic acid, phosphonic acid or amide as well as mixtures thereof;

R1 is H or a $C_1$-$C_4$ alkyl;

G is —$CH_2$ or —$CHCH_3$;

R2 is —($CH_2CH_2$—O—)$_n$ or (—$CH_2CHCH_3$—O—)$_n$ or a mixture thereof;

n ranges from about 1 to about 100;

X is an anionic radical selected from —$SO_3$, —$PO_3$ or —COO;

Z is —H or a water soluble cationic moiety which counterbalances the valence of the anionic radical X;

c and d are positive integers; and e is 0 or a non-negative integer.

In a preferred embodiment, the second monomer is an alkoxylated alcohol sulfate, such as of the formula:

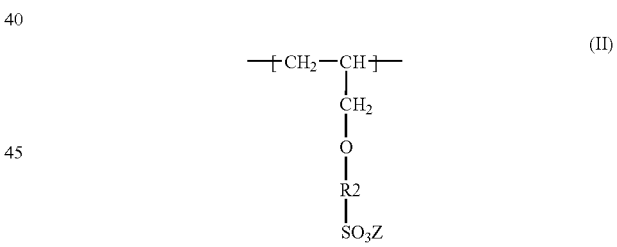

The optional third monomer, F, when present, is of the structure:

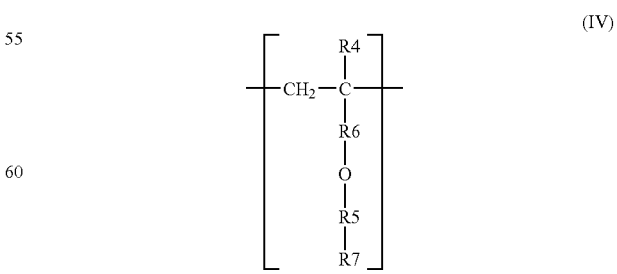

wherein:

R6 is —$CH_2$ or —C═O;

R7 is —H or a $C_1$-$C_{18}$ straight or branched alkyl chain or XZ (XZ having been defined as above), R4 is H or a straight or branched chain $C_1$-$C_4$ alkyl;

R5 is a hydroxy substituted alkyl or alkylene having from 1 to 6 carbon atoms, $(CH_2CH_2O)_n$, $(CH_2CH(CH_3)O)_n$ or a mixture of both; and n is an integer from about 1 to about 150.

The weight average molecular weight of the copolymer is between from about 1,000 to about 1,000,000 Daltons, preferably from about 1,500 to about 50,000 Daltons, most preferably about 25,000 Daltons.

DETAILED DESCRIPTION OF THE PREFERRED EMBODIMENTS

The set retarder used in the invention is a water-soluble or water-dispersible copolymer containing at least one polymerizable ethylenically unsaturated monomer and at least one alkoxylated sulfate, phosphate or ketonic salt. The set retarder is used with an aqueous slurry of cement for introduction into a gas or oil wellbore.

The set retarder is capable of delaying the set time of the cementitious composition until the slurry is placed into its desired location. When used, the set time of the aqueous slurry may be delayed until downhole temperatures as high as 500° F., even as high as 600° F., are obtained. Thus, the aqueous slurry may be hardened to a solid mass at elevated temperatures within the wellbore. Further, the aqueous slurries used in the invention may exhibit set times at elevated temperatures even in the absence of an intensifier.

In its preferred embodiments, the copolymer used in the cementitious slurry is preferably of the formula:

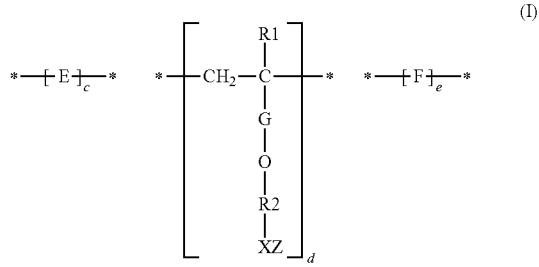

(I)

wherein unit E represents the polymerizable ethylenically unsaturated monomer and F represents an optional comonomer. The sulfate, phosphate or ketonic salt is the second depicted monomer. (As used herein, the term "copolymer" refers to a polymer derived from two or more polymerizable ethylenically unsaturated monomers. As such, the term "copolymer" includes "terpolymers".)

In a preferred embodiment, c is a positive integer and unit E is a carboxylic acid, amido carboxylic acid, carboxylic acid ester (such as a $C_1$-$C_6$ alkyl ester of carboxylic acid), amido carboxylic acid ester (such as a $C_1$-$C_6$ alkyl ester of amido carboxylic acid), hydroxylated alkyl ester of a carboxylic acid (such as a hydroxylated $C_1$-$C_6$ alkyl ester of carboxylic acid) or a hydroxylated amido carboxylic acid ester (such as a $C_1$-$C_6$ hydroxylated amido carboxylic acid ester), sulfonic acid, phosphonic acid or amide as well as mixtures thereof.

More preferably, unit E is at least one member selected acrylic acid, methacrylic acid, acrylamide, methacrylamide, N-methyl acrylamide, N,N-dimethyl acrylamide, N-isopropylacrylamide, maleic acid or anhydride, fumaric acid, itaconic acid, styrene sulfonic acid, vinyl sulfonic acid, isopropenyl phosphonic acid, vinyl phosphonic acid, vinylidene di-phosphonic acid, 2-acrylamido-2-methylpropane sulfonic acid and mixtures thereof and especially acrylic acid, methacrylic acid, acrylamide, maleic acid, maleic anhydride, fumaric acid, itaconic acid, 2-acrylamido-2-methylpropane-sulfonic acid and water-soluble salts thereof. In a most preferred embodiment, the polymerizable ethylenically unsaturated monomer is acrylic acid or methacrylic acid. In another preferred embodiment, the polymerizable ethylenically unsaturated monomer constitutes a mixture of acrylic acid and 2-acrylamido-2-methylpropane sulfonic acid. Water-soluble salts of such acids may also be used.

In the second monomer, R1 is H or a $C_1$-$C_4$ alkyl, preferably —H; G is —$CH_2$— or —$CHCH_3$—; R2 is —($CH_2CH_2$—O—)$_n$ or (—$CH_2CHCH_3$—O—)$_n$ or a mixture thereof, wherein n ranges from about 1 to about 100, preferably from about 1 to about 20; X is an anionic radical selected from —$SO_3$, —$PO_3$ or —COO; preferably —$SO_3$; Z is H or a water soluble cationic moiety which counterbalances the valence of the anionic radical X, including but not limited to $Na^+$, $K^+$, $Ca^{2+}$, $NH_4^+$, or an organic amine such as triethylamine or morpholine, c and d are positive integers; and e is 0 or a non-negative integer.

In a preferred embodiment, the second monomer is an alkoxylated alcohol sulfate, such as of the formula:

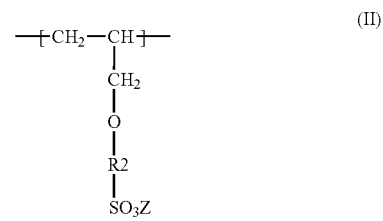

(II)

This second monomer can be prepared by ethoxylation, propoxylation or a combination of the ethoxylation and propoxylation of an allyl alcohol followed by an addition of sulfamic acid. The resultant is monomer unit having a covalently bonded sulfate terminated end group bonded through an atom.

A preferred copolymer, where e is 0, is acrylic acid/polyethyleneglycol monoallyl ether sulfate (APEGS) of the formula:

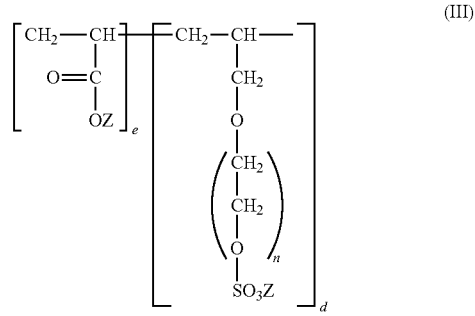

(III)

wherein n ranges from about 1 to about 100, preferably from about 1 to about 20; Z is hydrogen or a water-soluble cation such as Na, K, Ca or $NH_4$.

Molar ratio c:d ranges from about 30:1 to about 1:20. Preferably, the molar ratio of c:d ranges from about 15:1 to 1:10. The ratio of c to d is not critical to the present invention providing that the resulting polymer is water-soluble or water-dispersible.

The optional third monomer, F, when present, is of the structure:

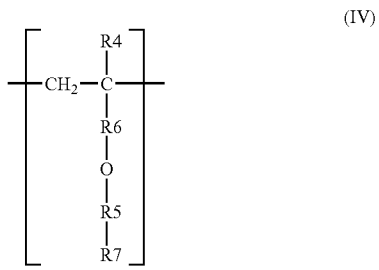

(IV)

wherein R6 is —$CH_2$ or —C=O; and R7 is —H or a $C_1$-$C_{18}$ straight or branched alkyl chain or XZ (XZ having been defined as above), R4 is H or a straight or branched chain $C_1$-$C_4$ alkyl, R5 is a hydroxy substituted alkyl or alkylene having from 1 to 6 carbon atoms, $(CH_2CH_2O)_n$, $(CH_2CH(CH_3))_n$, or a mixture of both, n being an integer from about 1 to about 150.

Preferred as the third monomers are (a) polyethylene glycol allyl ether (PEGAE) wherein R4 and R7 are both H, R6 is $CH_2$ and R5 is ($CH_2CH_2O$); (b) polypropylene glycol allyl ether (PPGAE) wherein R4 and R7 are both H, R6 is $CH_2$ and R5 is ($CH_2CH(CH_3)O$); (c) polyethylene glycol/propylene glycol allyl ether (PEGPGAE) wherein R4 and R7 are both H, R6 is $CH_2$ and R5 is ($CH_2CH_2OCH_2CH(CH_3)$)O; (d) hydroxyethyleneglycolmethyl methacrylate (HEME) wherein R4 is $CH_3$, R6 is —C=O, R5 is ($CH_2CH_2O$) and R7 is H; and (e) methoxyethyleneglycolmethyl methacrylate (MHEM) wherein R4 is $CH_3$, R6 is C=O, R5 is ($CH_2CH_2O$); and R7 is $CH_3$. In each of these preferred third monomers, R7 may be sulfonated.

Preferably, the molar ratio of first monomer (A) to second monomer (B) to third monomer (C) in the copolymerization product is in a range of from about 1 to about 10 for first monomer (A), from about 1 to about 4 for second monomer (B), and from 0 to about 10 for third monomer (C). More preferably, the molar ratio of first monomer (A) to second monomer (B) to third monomer (C) in the copolymerization product is in a range of from about 2.5 to about 6 for first monomer (A), from about 1 to about 2 for second monomer (B), and from about 0 or 1 to about 3 for third monomer (C) (or about 2.5-6:1-2:0 or 1-3).

A preferred terpolymer of the present invention, that is where e is a positive integer, is acrylic acid/polyethyleneglycol monoallyl ether sulfate/1-allyloxy-2-hydroxypropyl-3-sulfonic acid of the structure of Formula V:

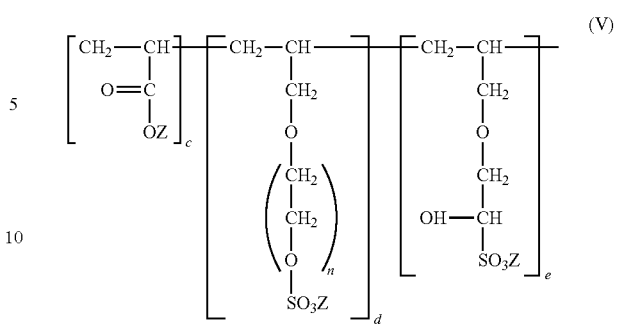

wherein n ranges from about 1 to about 100, preferably from about 1 to about 20; Z is hydrogen or a water-soluble cation (such as Na, K, Ca or $NH_4$) and wherein Z may be the same or different in c, d and e. The molar ratio of c:d in formula (III) is between from about 30:1 to about 1:20 and the molar ratio of c:d:e in formula (V) is between from about 20:10:1 to about 1:1:20.

The copolymer may be produced by solution, emulsion, micelle or dispersion polymerization techniques. Conventional polymerization initiators such as persulfates, peroxides, and azo type initiators may be used. Polymerization may also be initiated by radiation or ultraviolet mechanisms. Chain transfer agents such as isopropanol, allyl alcohol, hypophosphites, amines or mercapto compounds may be used to regulate the molecular weight of the polymer. Branching agents, such as methylene bisacrylamide and polyethylene glycol diacrylate and other multifunctional crosslinking agents, may further be added. The resulting polymer may be isolated by precipitation or other well-known techniques. If polymerization is in an aqueous solution, the polymer may simply be used in the aqueous solution form.

The weight average molecular weight of the copolymer is between from about 1,000 to about 1,000,000 Daltons, preferably from about 1,500 to about 50,000 Daltons, most preferably about 25,000 Daltons.

In a most preferred embodiment, the copolymer may be selected from one or more of the copolymers set forth in Table I below:

TABLE I

| Copolymer | monomer mole ratio | % solids | Viscosity, cP | pH |
|---|---|---|---|---|
| aa:apes-10 | 3:1 1 | 24.3 | 31.7 | 5.4 |
| " | 3:1 | 24.1 | 21.8 | 5.8 |
| aa:apes-20 | 2.5:1 | 25.2 | 12.3 | 5.5 |
| " | 3:1 | 23.7 | 18.7 | 5.2 |
| " | 4:1 | 23.6 | 21 | 5.1 |
| " | 5.6:1 | 25.6 | 65.9 | 5.9 |
| " | 8.9:1 | 23.1 | 8850 | 6.4 |
| aa:apes-50 | 3:1 | 24.6 | 19.3 | 4.7 |
| | 3:1 | 24.6 | 14.8 | 4.6 |
| aa:ape5-p5s | 3:1 | 24.2 | 13 | 5.5 |
| | 3:1 | 24.8 | 11 | 6.0 |
| maa/apae5-p5s | 3:1 | 25.2 | 10.6 | 6.4 |
| maa/aa/apes-10 | 1.5:1.5:1 | 24 | 31.2 | 6.1 |
| aa/apes-10/pegae-10 | 3:0.5:0.5 | 23.8 | 31.5 | 5.4 |
| aa/apes-20/pegae-20 | 3:0.5:0.5 | 25.1 | 20.3 | 5.5 |
| aa/apes-50/pegae-50 | 3:0.5:0.5 | 24.5 | 16.5 | 4.9 |
| aa/apes-20/pegae-50 | 3:0.5:0.5 | 25 | 14 | 5.1 |
| aa/apes-20/pegae-20 | 3:0.27:0.5 | 23.7 | 19 | 6.0 |
| aa/apes-20/pegae-20 | 3:0.27:0.5 | 25.7 | 50.5 | 6.1 |
| aa/apes-20/pegae-60 | 3:0.5:0.5 | 24.9 | 18.3 | 5.2 |
| aa/apes-20/pegae5-p5 | 3:0.5:0.5 | 24.8 | 14.2 | 5.5 |
| aa/apae5-p5s/pegae-50 | 3:0.5:0.5 | 24.7 | 17.1 | 5.2 |
| aa/apes-20/pegae-100 | 3:0.5:0.5 | 40.2 | 86.3 | 6.0 |

TABLE I-continued

| Copolymer | monomer mole ratio | % solids | Viscosity, cP | pH |
|---|---|---|---|---|
| aa/mhem-16/apes-20 | 3:0.5:0.5 | 24.4 | 19.7 | 6.6 |
| aa/apes-20/pegae5-p5 | 3:0.5:0.5 | 24.3 | 14.1 | 5.8 |
| aa/apes-20/pegae5-p5 | 3:0.5:0.5 | 24.84 | 14.2 | 5.5 | wherein aa is acrylic acid, maa is methyl (meth)acrylate; apes-10 is ammonium allylpolyethoxy (10) sulfate (alkoxylated with an average of 10 moles of ethylene oxide), apes-20 is ammonium allylpolyethoxy (20) sulfate (alkoxylated with an average of 20 moles of ethylene oxide), apes-50 is ammonium allylpolyethoxy (50) sulfate (alkoxylated with an average of 50 moles of ethylene oxide), ape5-p5s is ammonium allylpolyethoxy (5) polypropoxy (5) sulfate ((alkoxylated with an average of 5 moles of ethylene oxide and 10 moles of propylene oxide), pegae-10 is polyethylene glycol (10) allyl ether (alkoxylated with an average of 10 moles of ethylene oxide); pegae-20 is polyethylene glycol (20) allyl ether (alkoxylated with an average of 20 moles of ethylene oxide), pegae-50 is polyethylene glycol (50) allyl ether (alkoxylated with an average of 50 moles of ethylene oxide), pegae-60 is polyethylene glycol (60) allyl ether (alkoxylated with an average of 60 moles of ethylene oxide), pegae-100 is polyethylene glycol (100) allyl ether (alkoxylated with an average of 100 moles of ethylene oxide); and MHEM16 is methoxypolyethylene glycol monomethacrylate (alkoxylated with an average of 16 moles of ethylene oxide).

Hydraulically-active cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, or the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A-H" as listed in the API Spec 10, (1st ed., 1982), are suitable hydraulic cements. In addition, the cementitious material may include silica sand/flour and/or weighing agents including hematite or barite.

Mixing water is utilized with the dry cement composition to produce a fluid pumpable slurry of suitable consistency. API Spec 10, Second Edition, June 1984 which is known in the cement industry, describes an approved apparatus and method for measuring the consistency of cement slurries in terms of Bearden units of consistency (Bc). A pumpable slurry should measure in the range from about 2-20 Bc and preferably be in the range from about 5 to 11 Bc. Slurries thinner than about 5 Bc will tend to have greater particle settling and free water generation. Slurries thicker than about 20 Bc become increasingly difficult to mix and pump.

Depending upon the particular slurry and intended conditions of use, mixing water is utilized in the slurry of the present invention in the range from about 30 to 150 weight percent based upon the dry weight of cement and preferably is in the range of about 35 to 90 weight percent.

The cementitious slurry of the invention may further contain conventional additives used in the cementing of a gas or oil wellbore such as suspending or thixotropic agents, fluid loss control additives, strength retrogression additives, permeability reducers, weighting materials, permeability reducers and anti-settling agents, etc.

The set retarders employed in the cementitious slurries of the invention do not require an intensifier. In fact, the cementitious slurries typically exhibit retardation of set time at temperatures in excess of 600° F. If desired, intensifiers known in the art, such as those disclosed in U.S. Pat. No. 5,105,885, may be employed.

The following non-limiting examples, and comparative demonstrations, bring out the more salient features of the invention. All parts are given in terms of weight units except as may otherwise be indicated.

EXAMPLES

In each of the Examples, a hydraulic cement, water, set retarder and remaining additives were mixed together to form a pumpable slurry. The cement slurry was then pumped to the desired location in the wellbore and allowed to harden to form a solid mass. The abbreviations used in the tables have the following meanings:

PPG, pounds per gallon
GPS, gallons per sack
W-10, a weighting material having a particle size of 5 microns, a product of BJ Services Company;
100 mesh refers to 100 mesh silica sand (versus approximately 325 mesh for silica flour), strength retrogression additives;
BA-11, a bonding agent and permeability reducer, a product of BJ Services Company;
BA-90, uncompacted silica fume, a permeability reducer and a product of BJ Services Company;
FLR-1, a high molecular weight polyacrylate fluid loss additive, a product of Fritz Industries;
FL-63, a high molecular weight grafted tannin, a product of Aqualon, a division of Hercules, Inc.
ASA-500, a polymeric dry blend used as an anti-settling agent to eliminate free fluid development in cement slurries, a product of BJ Services Company;
ASA-301, an anti-settling agent of BJ Services Company;
SMS refers to sodium metasilicate, an anti-settling agent;
Coag-139 and AP0600 refer to acrylic acid/polyethylene glycol allyl ether copolymers, commercially available from GE Betz Company;
DCA-229L refers to an acrylic acid/ammonium allylpolyethoxy (10) sulfate copolymer, a product of GE Betz Company.
MPA-3 refers to wollastonite.
APO100 refers to diluted Coag-139, in approximately 15 weight percent water;

Cementitious slurries were prepared by mixing neat Class H Portland cement and fresh water at 16.4, 17.5 and 18 pounds per gallon (ppg). To the slurry was added an amount in gallons per sack of cement (gps) of set retarder along with other designated additives at room temperature. The resultant slurries were kept with occasional agitation.

Standard API viscosity and fluid loss tests were conducted on the cement slurries; the viscosity being measured against industry standard torque measurement of 70/100 Bc (representing the amount of torque required to move the paddle through the cement slurry). Set retardation continued for about 6 hours. The results and amount of additives (percentages are by weight of cement, BWOC) are set forth in Tables II-VIII below. Temperatures are at ° F. The "Thickening Time" represents the amount of time (hrs:minutes) that the slurry remained in a liquid state, for instance the measurement "5:45/5:46" refers to the amount of time for the cement slurry to reach 70/100 Bc and thus is indicative of the amount of time that the cement slurry remains pumpable at the stated temperature. Illustrative for the data for compressive strength, as set forth in Example 7, of "500/17:40" refers to the fact that the cement slurry exhibited a compressive strength of 500 psi after 17 hours and 40 minutes.

TABLE II

| Ex. No. | Density | W-10 % | Silica Flour % | 100 mesh % | BA-90 % | BA-11 % | FLR-1 % | ASA-500 % | Coag-139 gps | Temp. ° F. | Thickening Time 70/100 Bc | Fluid Loss | Compressive Strength psi/time(hrs:min) |
|---|---|---|---|---|---|---|---|---|---|---|---|---|---|
| 1 | 17.5 | 10 | | 35 | 4 | 1 | 1 | 0.3 | 0.2 | 312 | 5:45/5:46 | | |
| 2 | 18 | 25 | | 35 | 4 | 1 | 1 | 0.3 | 0.2 | 345 | 1:36/1:38 | | |
| 3 | " | " | | " | 3 | " | " | " | " | " | 1:26/1:28 | | |
| 4 | " | " | | " | 4 | " | " | " | 0.225 | " | 2:10/2:11 | | |
| 5 | " | " | | " | " | " | " | " | 0.25 | " | 3:36/3:37 | | |
| 6 | " | " | | " | " | " | " | " | 0.275 | " | 5:45/5:47 | 18 | 500/17:40: 1737/24: 2290/48 |
| 7 | | | | | | | | | | | | | |
| 8 | " | " | | " | " | " | " | " | 0.28 | " | 8:35/8:36 | | |
| 9 | 16.4 | | 35 | | 2 | 1.5 | 0.75 | 0.3 | 0.2 | 370 | | | |
| 10 | 16.4 | | " | | " | " | 1 | " | " | " | 6:53/6:54 | 28 | 500/16:26: 3776/24 |
| 11 | " | | " | | 3 | " | " | " | " | " | 5:06/5:07 | | |
| 12 | " | | " | | 4 | " | " | " | " | " | 3:03/3:09 | | |
| 13 | " | | " | | " | " | " | " | 0.225 | " | 4:26/4:27 | | |
| 14 | " | | " | | " | " | " | " | 0.23 | " | 5:50/5:51 | | |
| 15 | " | | " | | " | " | " | " | 0.25 | " | 10:32/10:33 | | |
| 16 | 16.48 | | 35 | | | | | 1 | 0.1 | 200 | 31:30:00 | | |
| 17 | 16.48 | | 35 | | | | | 1 | 0.1 | 300 | 1:56 | | |
| 18 | " | | " | | | | | " | 0.15 | " | 3:07 | | |
| 19 | " | | " | | | | | " | 0.175 | " | 45:11:00 | | |
| 20 | 16.48 | | 35 | | | | | 1 | 0.1 | 400 | 1:17 | | |
| 21 | " | | " | | | | | " | 0.15 | " | 1:36 | | |
| 22 | " | | " | | | | | " | 0.175 | " | 6:33 | | |
| 23 | " | | " | | | | | " | 0.2 | " | 10:40 | | |
| 24 | 16.48 | | 35 | | | | | 1 | 0.2 | 500 | 3:16 | | |
| 25 | | | " | | | | | " | 0.225 | " | 7:51 | | |
| 26 | " | | " | | | | | " | 0.25 | " | 8:50 | | |
| 27 | " | | " | | | | | " | 0.3 | " | 10:24 | | |
| 28 | 16.48 | | 35 | | | | | 1 | 0.4 | 600 | 3:10 | | |
| 29 | " | | " | | | | | " | 0.5 | " | 3:22 | | |
| 30 | " | | " | | | | | " | 0.7 | " | 3:42 | | |

TABLE III

| Ex. No. | Density ppg | Silica Flour % | ASA-301 % | ASA-500 % | SMS % | APO100 gps | Temp. ° F. | Thickening Time hrs:min 70/100 Bc |
|---|---|---|---|---|---|---|---|---|
| 31 | 16.5 | 35 | 0.2 | | | 0.05 | 201 | 3:34/3:38 |
| 32 | " | " | " | | | 0.1 | " | 15:49/15:53 |
| 33 | " | " | | | | 0.05 | " | 3:50/3:53 |
| 34 | " | " | | | | 0.1 | " | 8:35/8:38 |
| 35 | " | " | | | 0.2 | 0.1 | " | 3:00/3:04 |
| 36 | " | " | | | " | 0.2 | " | |
| 37 | 16.5 | 35 | 0.2 | | | 0.1 | 258 | 1:48/1:49 |
| 38 | " | " | " | | | 0.2 | " | 3:06/3:08 |
| 39 | " | " | " | | | 0.3 | " | 5:10/5:11 |
| 40 | 16.5 | 35 | 0.2 | | | 0.2 | 291 | 1:55/1:56 |
| 41 | " | " | " | | | 0.25 | " | 2:47/2:48 |
| 42 | " | " | " | | | 0.3 | " | 4:40/4:40 |
| 43 | " | " | " | | | 0.35 | " | 6:17/6:18 |
| 44 | " | " | " | | | 0.4 | " | 23:13/23:14 |
| 45 | 16.5 | 35 | 0.2 | | | 0.3 | 364 | 1:41/1:42 |
| 46 | " | " | " | | | 0.35 | " | 8:24/8:25 |
| 47 | " | " | " | | | 0.4 | " | 24:18/24:18 |
| 48 | " | " | | 0.5 | | 0.2 | " | 1:17/1:18 |
| 49 | " | " | | " | | 0.25 | " | 2:15/2:15 |
| 50 | " | " | | " | | 0.3 | " | 18:47/18:48 |
| 51 | " | " | | " | | 0.35 | " | 29:51/29:52 |
| 52 | 16.5 | 35 | | 0.5 | | 0.25 | 404 | 1:10/1:10 |
| 53 | " | " | | " | | 0.275 | " | 2:49/2:50 |
| 54 | " | " | | " | | 0.3 | " | 7:01/7:02 |
| 55 | " | " | | " | | 0.35 | " | 20:34/20:34 |
| 56 | " | " | | " | | 0.4 | " | 23:46/23:47 |
| 57 | 16.5 | 35 | | 0.5 | | 0.3 | 444 | 3:04/3:04 |

TABLE III-continued

| Ex. No. | Density ppg | Silica Flour % | ASA-301 % | ASA-500 % | SMS % | APO100 gps | Temp. °F. | Thickening Time hrs:min 70/100 Bc |
|---|---|---|---|---|---|---|---|---|
| 58 |  | " |  | " |  | 0.35 | " | 6:37/6:37 |
| 59 | " | " |  | " |  | 0.4 | " | 8:52/8:52 |
| 60 |  | " |  | " |  | 0.5 | " | 11:55/11:55 |
| 61 | 16.5 | 35 |  | 0.5 |  | 0.4 | 484 | 4:29/4:30 |
| 62 |  | " |  | " |  | 0.5 | " | 10:27/10:27 |

TABLE IV

| Ex. No. | Density ppg | Silica Flour % | BA-90 % | ASA-500 % | BA-11 % | FL-63 % | APO 100 gps | Temp. °F. | Thickening Time hrs:min 70/100 |
|---|---|---|---|---|---|---|---|---|---|
| 63 | 16.2 | 35 | 3 | 1 |  | 0.8 | 0.22 | 250 | 3:39/3:41 |
| 64 | " | " | " | " |  | " | 0.24 | " | 3:52/3:54 |
| 65 | " | " | " | " |  | " | 0.26 | " | 4:16/4:18 |
| 66 | 16.2 | 35 | 3 | 1 |  | 0.8 | 0.2 | 275 | 2:07/2:09 |
| 67 | " | " | " | " |  | " | 0.22 | " | 2:15/2:17 |
| 68 | " | " | " | " |  | " | 0.24 | " | 2:24/2:25 |
| 69 | " | " | " | " |  | " | 0.28 | " | 2:39/2:40 |
| 70 | " | " | " | " |  | " | 0.32 | " | 3:06/3:07 |
| 71 | " | " | " | " |  | " | 0.35 | " | 4:50/4:53 |
| 72 | " | " | " | " |  | " | 0.38 | " | 15:53/15:55 |
| 73 | 16.5 | 35 |  | 1 | 1 | 1 | 0.25 | 360 | 1:38/1:39 |
| 74 | " | " |  | " | " | " | 0.3 | " | 2:03/2:04 |
| 75 | " | " |  | " | " | " | 0.325 | " | 8:01/8:01? |
| 76 | " | " |  | " | " | " | 0.35 | " | 13:07/13:07 |
| 77 | " | " |  | " |  | " | 0.325 | " | 2:49/2:50 |
| 78 | " | " |  |  | 1 | " | " | " | 1:35/1:36 |
| 79 | " | " |  | 1 | " | 1.2 | 0.34 | 397 | 2:56/2:56 |
| 80 | " | " |  | " | " | " | 0.36 | " | 5:50/5:51 |
| 81 | " | " |  | " | " | " | 0.38 | " | 9:02/9:02 |
| 82 | " | " |  | " | " | " | 0.4 | " | 8:39/8:40? |
| 83 | " | " |  | " | " | " | 0.42 | " | 12:00+ |

TABLE V

| Ex. No. | Density ppg | 100 Mesh % | MPA-3 % | ASA-500 % | BA-11 % | FL-63 % | APO 100 gps | Temp. °F. | Thickening Time hrs:min |
|---|---|---|---|---|---|---|---|---|---|
| 84 | 17.5 | 35 | 25 | 1 | 1 | 1 | 0.35 | 360 | 1:30/1:33 |
| 85 | " | " | " | 0.5 | " | " | 0.4 | " | 1:42/1:43 |
| 86 | " | " | " | 0.25 | " | " | 0.43 | " | 5:25/5:26 |
| 87 | " | " | " | " | " | " | 0.45 | " | 5:53/5:53 |
| 88 | " | " | " | " | " | " | 0.47 | " | 8:15/8:16 |
| 89 | 16.5 | 35 |  | 1 | 1 | 1 | 0.32 | 360 | 1:56/1:56 |
| 90 | " | " |  | " | " | " | 0.33 | " | 1:51/1:53 |
| 91 | " | " |  | " | " | " | 0.34 | " | 9:25/9:25 |
| 92 | " | " |  | " | " | " | 0.35 | " | 12:10/12:11 |
| 93 | " | " | 25 | " | " | " | 0.34 | " |  |
| 94 | 16.5 | 35 |  | 1 | 1 | 1.2 | 0.34 | 397 | 1:32/1:41 |
| 95 | " | " |  | " | " | " | " | " | 1:40/1:47 |

TABLE VI

| Ex. No. | Density ppg | 100 Mesh % | Hematite % | BA-58 % | FLR-1 % | APO 100 gps | Temp. °F. | Thickening Time hrs:min 70/100 |
|---|---|---|---|---|---|---|---|---|
| 96 | 18.5 | 35 | 30 | 5 | 1 |  | 422 |  |
| 97 | " | " | 27.5 | 7.5 | " |  | " | 1:31/1:31 |
| 98 | " | " | 25 | 10 | " |  | " | 0:51/0:52 |
| 99 | " | " | " | " |  | " | " | 0:52/0:53 |
| 100 | " | " | " | " | " | " | " | 1:00/1:02 |
| 101 | " | " | 30 | 5 | " | 0.3 | " | 0:55/0:56 |
| 102 | " | " | " | " | " | 0.4 | " | 1:10/1:12 |
| 103 | " | " | " | " | " | 0.45 | " | 1:17/1:18 |
| 104 | " | " | " | " | " | " | " | 1:28/1:28 |
| 105 | " | " | " | " | " | 0.48 | " | 4:34/4:34 |
| 106 | " | " | " | " | " | 0.5 | " | 4:49/4:49 |

TABLE VI-continued

| Ex. No. | Density ppg | 100 Mesh % | Hematite % | BA-58 % | FLR-1 % | APO 100 gps | Temp. °F. | Thickening Time hrs:min 70/100 |
|---|---|---|---|---|---|---|---|---|
| 107 | " | " | " | " | " | " | " | 4:28/4:28 |
| 108 | " | " | " | " | " | " | " | 8:00+ |
| 109 | " | " | " | 6 | " | " | " | 2:55/2:28 |
| 110 | " | " | " | 7 | " | " | " | 1:11/1:12 |
| 111 | 18.5 | 35 | 30 | 5 | 1 | 0.48 | 422 | 1:15/1:16 |
| 112 | " | " | " | " | " | 0.5 | " | 3:12/3:12 |
| 113 | " | " | " | " | " | 0.52 | " | 7:00/7:00 |

TABLE VII

| Ex. No. | Density | 100 Mesh | W-10 | BA-58 | FLR-1 | APO 100 | Temp. | Thickening Time |
|---|---|---|---|---|---|---|---|---|
| 114 | 18.5 | 35 | 30 | 5 | 1 | 0.48 | 422 | 0:57/0:58 |
| 115 | " | " | " | " | " | 0.52 | " | 1:00/1:01 |
| 116 | " | " | " | " | " | 0.6 | " | 1:13/1:13 |
| 117 | " | " | " | " | " | 0.65 | " | |
| 118 | " | " | " | " | " | 0.7 | " | |
| 119 | " | " | " | " | " | 0.8 | " | |

TABLE VIII

| Ex. No. | Density | W-10 % | Silica Flour % | 100 mesh % | BA-58 % | BA-11 % | FLR-1 % | ASA-500 % | DCA-229L gps | Temp.° F. | Thickening Time 70/100 Bc |
|---|---|---|---|---|---|---|---|---|---|---|---|
| 121 | 17.5 | 10 | | 35 | 8 | 1 | 1 | 0.5 | 0.1 | 312 | 1:51/1:52 |
| 122 | " | 15 | | " | " | " | " | " | 0.2 | " | 5:13/5:13 |
| 123 | " | 10 | | " | 6 | " | " | " | " | " | |
| 124 | 18 | 25 | | 35 | 8 | 1 | 1 | 0.5 | 0.1 | 345 | 1:20/1:20 |
| 125 | " | " | | " | " | " | " | " | 0.2 | " | 2:48/2:49 |
| 126 | " | " | | " | " | " | " | 0.3 | 0.2 | " | 4:37/4:39 |
| | " | " | | " | 7 | " | " | " | " | " | |
| 127 | " | " | | " | 7 | " | " | 0.5 | 0.25 | " | 42:16/42:16 |
| 128 | " | " | | " | " | " | " | " | 0.3 | " | 76:19/76:20 |
| 129 | " | " | | " | " | " | " | " | 0.4 | " | 81:31/81:31 |
| 130 | 16.4 | | 35 | | 8 | 1.5 | 1 | 0.3 | 0.15 | 370 | 3:14/3:14 |
| 131 | " | | " | | 7 | " | " | " | " | " | |
| 132 | " | | " | | 6 | " | " | " | " | " | |
| | " | | " | | 5 | " | " | " | " | " | 8:07/8:08 |
| 133 | " | | " | | " | " | " | " | 0.175 | " | 7:12/7:13 |
| 134 | " | | " | | " | " | " | " | 0.2 | " | 10:35/10:36 |
| 135 | " | | " | | " | 1 | " | 0.5 | 0.25 | " | 16:49/16:49 |
| 136 | 16.48 | | 35 | | | | | 1 | 0.05 | 300 | 2:17 |
| 137 | | | " | | | | | " | 0.075 | " | 2:44 |
| 138 | | | " | | | | | " | 0.1 | " | 16:46 |
| 139 | 16.2 | | 35 | | | | | 1 | 0.1 | 400 | 8:16 |
| 140 | 16.48 | | " | | | | | " | " | " | 7:47 |
| 141 | 16.48 | | 35 | | | | | 1 | 0.1 | 500 | 2:14 |
| 142 | " | | " | | | | | " | 0.2 | " | 9:23 |
| 143 | 16.48 | | 35 | | | | | 1 | 0.3 | 600 | 3:44 |
| 144 | " | | " | | | | | " | 0.4 | " | 4:05 |
| 145 | | | " | | | | | " | 0.6 | " | 4:16 |
| 146 | | | " | | | | | " | 0.8 | " | 4:09 |
| 147 | | | " | | | | | " | 2 | " | 1:37 |

The Examples illustrate the ability of the cement slurries, when used in accordance with the invention, to thicken and exhibit high compressive strengths over extended periods of time. The presence of the copolymers in the cement slurries function to retard the setting of the cement, especially at elevated temperatures, as evidenced by the increased thickening times. The slurries do not require the presence of an intensifier. Further, the amount of copolymer required to demonstrate the desired degree of retardation is low.

From the foregoing, it will be observed that numerous variations and modifications may be effected without departing from the true spirit and scope of the novel concepts of the invention.

What is claimed is:

1. A method of retarding the set time of a cementitious slurry until placed in a desired location within a gas or oil wellbore, comprising:
introducing into the wellbore a pumpable cementitious slurry comprising water, a cement and a water-soluble or water-dispersible set retarder, the set retarder comprising a copolymer of (i) at least one polymerizable ethylenically unsaturated monomer; and (ii) at least one alkoxylated sulfate, phosphate, or carboxylate salt, wherein the consistency of the cementitious slurry is between from about 2 to about 20 Bearden units of consistency and further wherein the amount of water in the cementitious slurry is between from about 30 to 150 weight percent based on the dry weight of the cement; and
allowing the slurry to harden to a solid mass;
the copolymer being present in the cementitious slurry in an amount sufficient to retard the set time of the cementitious slurry until the cementitious slurry is placed in the desired location within the wellbore.

2. The method of claim 1, wherein hardening of the cementitious slurry is delayed until the downhole temperature is greater than or equal to 500° F.

3. The method of claim 2, wherein hardening of the cementitious slurry is delayed until the downhole temperature is greater than or equal to 600° F.

4. The method of claim 2, wherein the at least one polymerizable ethylenically unsaturated monomer is acrylic acid or methacrylic acid.

5. The method of claim 1, wherein the at least one alkoxylated sulfate is of the formula:

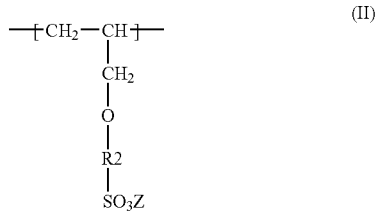

wherein R2 is —(CH$_2$CH$_2$—O—)$_n$ or (—CH$_2$CHCH$_3$—O—)$_n$ or a mixture thereof, n is between from about 1 to about 100; and Z is H, or a water soluble cationic moiety which counterbalances the valence of the anionic radical X.

6. The method of claim 5, wherein the at least one polymerizable ethylenically unsaturated monomer is a C$_1$-C$_6$ alkyl ester of a carboxylic acid, C$_1$-C$_6$ alkyl ester of an amido carboxylic acid, a hydroxylated C$_1$-C$_6$ alkyl ester of a carboxylic acid or a C$_1$-C$_6$ hydroxylated amido carboxylic acid ester.

7. The method of claim 1, wherein the at least one polymerizable ethylenically unsaturated monomer is selected from the group consisting of acrylic acid, methacrylic acid, acrylamide, methacrylamide, N-methyl acrylamide, N, N-dimethyl acrylamide, N- isopropylacrylamide, maleic acid or anhydride, fumaric acid, itaconic acid, styrene, sulfonic acid, vinyl sulfonic acid, isopropenyl phosphonic acid, vinyl phosphonic acid, vinylidene di-phosphonic acid, 2-acrylamido-2-methylpropane sulfonic acid and mixtures thereof.

8. The method of claim 1, wherein the weight average molecular weight of the copolymer is between from about 1,000 to about 1,000,000 Daltons.

9. The method of claim 8, wherein the weight average molecular weight of the copolymer is between from about 1,500 to about 50,000 Daltons.

10. The method of claim 1, wherein the copolymer is of the formula:

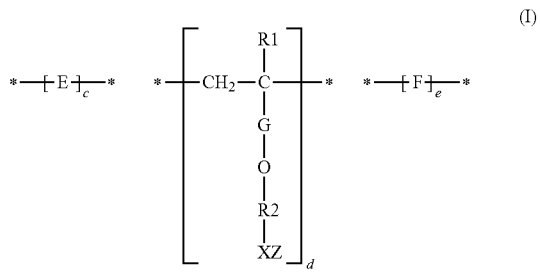

wherein:
E is at least one carboxylic acid, amido carboxylic acid, carboxylic acid ester, amido carboxylic acid ester, hydroxylated alkyl ester of a carboxylic acid or a hydroxylated amido carboxylic acid ester sulfonic acid, phosphonic acid or amide as well as mixtures thereof;
F is of the structure:

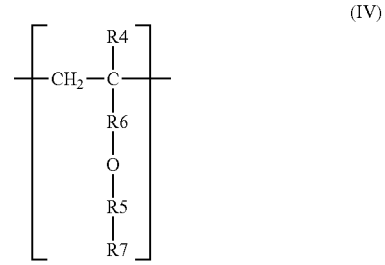

R1 is H or a C$_1$-C$_4$ alkyl;
G is —CH$_2$— or —CHCH$_3$—;
R2 is —(CH$_2$CH$_2$—O—)$_n$ or (—CH$_2$CHCH$_3$—O—)$_n$ or a mixture thereof;
R6 is —CH$_2$ or —C=O;
R7 is —H or a C$_1$-C$_{18}$ straight or branched alkyl chain or XZ,
R4 is H or a straight or branched chain C$_1$-C$_4$ alkyl;
R5 is a hydroxy substituted alkyl or alkylene having from 1 to 6 carbon atoms, (CH$_2$CH$_2$O)$_n$, (CH$_2$CH(CH$_3$)O)$_n$ or a mixture thereof;
X is an anionic radical selected from the group consisting of SO$_3$, PO$_3$, and COO;

Z is H or a water soluble cationic moiety which counterbalances the valence of the anionic radical X;
c and d are positive integers;
e is 0 or a non-negative integer; and
n being an integer from about 1 to about 150.

11. The method of claim 10, wherein E is a $C_1$-$C_6$ alkyl ester of a carboxylic acid, $C_1$-$C_6$ alkyl ester of an amido carboxylic acid, hydroxylated $C_1$-$C_6$ alkyl ester of a carboxylic acid or a $C_1$-$C_6$ hydroxylated amido carboxylic acid ester.

12. The method of claim 10, wherein E is at least one member selected from the group consisting of acrylic acid, methacrylic acid, acrylamide, methacrylamide, N-methyl acrylamide, N, N-dimethyl acrylamide, N-isopropylacrylamide, maleic acid or anhydride, fumaric acid, itaconic acid, styrene sulfonic acid, vinyl sulfonic acid, isopropenyl phosphonic acid, vinyl phosphonic acid, vinylidene di-phosphonic acid, 2-acrylamido-2-methylpropane sulfonic acid and mixtures thereof.

13. The method of claim 10, wherein E is at least one member selected from the group consisting of acrylic acid, methacrylic acid, acrylamide, maleic acid, maleic anhydride, fumaric acid, itaconic acid, 2-acrylamido-2-methylpropanesulfonic acid and water-soluble salts thereof.

14. The method of claim 13, wherein E is acrylic acid, methacrylic acid or a mixture of acrylic acid and 2-acrylamido-2-methylpropane sulfonic acid.

15. The method of claim 10, wherein R1 is —H; n is between from about 1 to about 20; and X is $SO_3$, Z is $Na^+$, $K^+$, $Ca^{2+}$, $NH_4^+$ or an organic amine.

16. The method of claim 10, wherein F is selected from the group consisting of polyethylene glycol allyl ether, polypropylene glycol allyl ether, polyethylene glycol/propylene glycol allyl ether, hydroxyethyleneglycolmethyl methacrylate and methoxyethyleneglycolmethyl methacrylate.

17. The method of claim 10, wherein the ratio c: d: e ranges from about 1-10:1-4:0-10.

18. The method of claim 17, wherein e is zero and the ratio c: d ranges from about 30:1 to about 1:20.

19. The method of claim 1, wherein the cementitious slurry does not contain an intensifier.

20. The method of claim 1, wherein the cementitious slurry further contains at least one additive selected from the group consisting of fluid loss control additives, strength retrogression additives, permeability reducers, weighting materials, permeability reducers and anti-settling agents.

21. (New.) The method of claim 1, wherein the consistency of the cementitious slurry is from about 5 to 11 Bearden units of consistency.

22. A method of cementing pipes or casings in a wellbore, comprising:
pumping a cementitious slurry comprising water; a set retarder and a hydraulically-active cementitious material down the inside of the pipe or casing and back up the outside of the pipe or casing through the annulus between the pipe or casing and the wellbore, wherein the set retarder of the cementitious slurry is
a copolymer selected from the group consisting of:

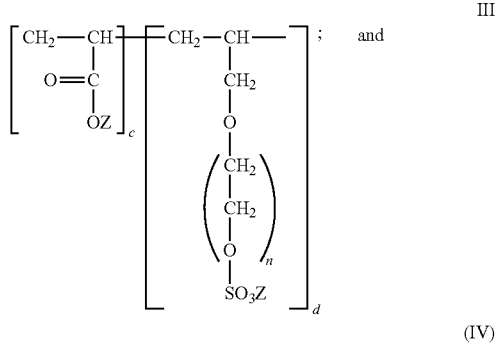

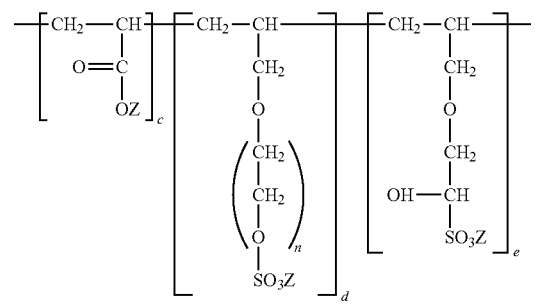

and
wherein Z is hydrogen or a water-soluble cation, n is between from about 1 to about 100 and the molar ratio of c:d in formula (III) is between from about 30:1 to about 1:20 and the molar ratio of c:d:e in formula (V) is between from about 20:10:1 to about 1:1:20; and further wherein the amount of water in the cementitious slurry is between from about 30 to about 150 weight percent based on the dry weight of the cement; and
delaying the set time of the cementitious slurry, wherein the copolymer is present in an amount sufficient in the cementitious slurry to retard the set time of the cementitious slurry.

23. The method of claim 22, wherein the cementitious slurry further contains at least one additive selected from the group consisting of fluid loss control additives, strength retrogression additives, permeability reducers, weighting materials, permeability reducers and anti-settling agents.

24. The method of claim 22, wherein the cementitious material is slag or a blend of hydraulic cement and slag.

25. The method of claim 22, wherein the cementitious material is a Class A through Class H cement.

* * * * *

UNITED STATES PATENT AND TRADEMARK OFFICE
CERTIFICATE OF CORRECTION

PATENT NO. : 8,096,359 B2  Page 1 of 1
APPLICATION NO. : 11/601512
DATED : January 17, 2012
INVENTOR(S) : Windal S. Bray It is certified that error appears in the above-identified patent and that said Letters Patent is hereby corrected as shown below:

Column 17, Claim 21, line 46 should read -The method of claim 1, wherein the consistency-.

Column 18, Claim 22, line 18 should read -(V)-.

Column 18, Claim 22, lines 19-30 should read

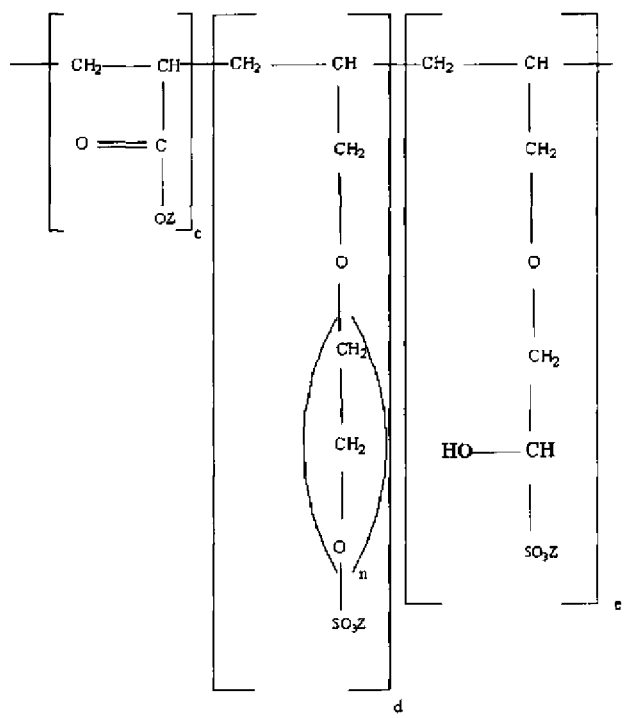

Signed and Sealed this
Twenty-eighth Day of February, 2012

David J. Kappos
*Director of the United States Patent and Trademark Office*